United States Patent
Chen et al.

(10) Patent No.: US 11,991,011 B2
(45) Date of Patent: May 21, 2024

(54) POWER SUPPLY DEVICE, POWER SUPPLY SYSTEM AND NON-TRANSITORY COMPUTER-READABLE RECORDING MEDIUM

(71) Applicant: Realtek Semiconductor Corporation, Hsinchu (TW)

(72) Inventors: Bing Chen, Jiangsu Province (CN); Tao Cui, Jiangsu Province (CN); Mingxu Wang, Jiangsu Province (CN); Zheng-Bei Xing, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 240 days.

(21) Appl. No.: 17/644,341

(22) Filed: Dec. 15, 2021

(65) Prior Publication Data
US 2023/0027611 A1    Jan. 26, 2023

(30) Foreign Application Priority Data
Jul. 26, 2021 (CN) .......................... 202110844943.2

(51) Int. Cl.
| | |
|---|---|
| *H04L 12/10* | (2006.01) |
| *G06F 13/38* | (2006.01) |
| *G06F 13/42* | (2006.01) |

(52) U.S. Cl.
CPC ............ *H04L 12/10* (2013.01); *G06F 13/385* (2013.01); *G06F 13/4221* (2013.01)

(58) Field of Classification Search
CPC ..... G06F 13/385; G06F 13/4221; H04L 12/10
See application file for complete search history.

(56) References Cited

U.S. PATENT DOCUMENTS

| | | | | |
|---|---|---|---|---|
| 5,315,554 A | * | 5/1994 | Nanba .................... | G11C 29/50 |
| | | | | 365/201 |
| 5,498,398 A | * | 3/1996 | Kang ....................... | C01G 3/12 |
| | | | | 423/48 |

(Continued)

FOREIGN PATENT DOCUMENTS

| | | | | |
|---|---|---|---|---|
| CN | 201352835 Y | * | 11/2009 | |
| CN | 101788304 A | * | 7/2010 | ............... H04N 7/18 |

(Continued)

OTHER PUBLICATIONS

Phlips Semiconductors, the I2C-Bus Specification, Version 2.1, Jan. 2020, pp. 1-48 (Year: 2020).*

(Continued)

*Primary Examiner* — Berhanu Tadese
(74) *Attorney, Agent, or Firm* — CKC & Partners Co., LLC

(57) ABSTRACT

A power supply device including a register circuit, an internal control circuit, and a storage circuit is disclosed. The register circuit includes a first sub-register circuit and a second sub-register circuit. The first sub-register circuit and the second sub-register circuit are configured to take turns to temporarily store a data transmitted form an external control circuit. The internal control circuit is coupled to the register circuit, and the internal control circuit is configured to obtain the data temporarily stored in the first sub-register circuit and the second sub-register circuit. The storage circuit is coupled to the internal control circuit, and the storage circuit is configured to obtain the data from the internal control circuit and to store the data.

20 Claims, 5 Drawing Sheets

(56) References Cited

U.S. PATENT DOCUMENTS

| | | | | |
|---|---|---|---|---|
| 7,099,967 | B2 * | 8/2006 | Farkas | G06F 8/63 |
| | | | | 717/169 |
| 7,685,320 | B1 * | 3/2010 | Wishneusky | G06F 1/26 |
| | | | | 713/340 |
| 8,036,762 | B1 * | 10/2011 | Young | H02M 3/156 |
| | | | | 323/283 |
| 8,234,463 | B2 * | 7/2012 | Ikeuchi | G06F 13/4243 |
| | | | | 711/155 |
| 8,291,270 | B2 * | 10/2012 | Mishima | G06F 11/2221 |
| | | | | 714/719 |
| 8,301,858 | B2 * | 10/2012 | Tashima | G06F 13/4239 |
| | | | | 711/170 |
| 8,335,883 | B2 * | 12/2012 | Tateyama | G06F 13/385 |
| | | | | 710/308 |
| 8,495,287 | B2 * | 7/2013 | Collura | G06F 11/0751 |
| | | | | 711/106 |
| 9,176,740 | B2 * | 11/2015 | Noyes | G06F 9/35 |
| 9,563,368 | B2 * | 2/2017 | Shin | G06F 3/0611 |
| 9,824,004 | B2 * | 11/2017 | Mirichigni | G06F 12/023 |
| 10,067,906 | B2 * | 9/2018 | Lee | G06F 11/0757 |
| 10,114,774 | B2 * | 10/2018 | Kawashima | H04L 67/1097 |
| 10,535,990 | B2 * | 1/2020 | Chen | H02H 3/26 |
| 10,635,629 | B2 * | 4/2020 | Yost | G06F 13/4282 |
| 10,754,800 | B2 * | 8/2020 | Cheong | G06F 13/4282 |
| 10,775,871 | B2 * | 9/2020 | Garg | G06F 1/3215 |
| 11,119,959 | B2 * | 9/2021 | Sheu | G06F 13/4004 |
| 11,144,305 | B2 * | 10/2021 | Lee | G06F 8/61 |
| 11,288,223 | B2 * | 3/2022 | Chang | G06F 1/185 |
| 11,340,995 | B2 * | 5/2022 | Seger, Jr. | H04L 1/00 |
| 11,461,255 | B2 * | 10/2022 | Wei | G06F 13/24 |
| 11,507,718 | B1 * | 11/2022 | Shen | G01R 31/31704 |
| 11,762,593 | B2 * | 9/2023 | Furuta | G06F 3/0688 |
| | | | | 711/154 |
| 2005/0138615 | A1 * | 6/2005 | Farkas | G06F 8/65 |
| | | | | 717/168 |
| 2007/0101166 | A1 * | 5/2007 | Boyum | G06F 1/26 |
| | | | | 713/300 |
| 2009/0094450 | A1 * | 4/2009 | Krzyzanowski | G06F 11/1433 |
| | | | | 713/100 |
| 2009/0198966 | A1 * | 8/2009 | Gschwind | G06F 9/3013 |
| | | | | 712/E9.016 |
| 2009/0300297 | A1 * | 12/2009 | Ikeuchi | G06F 13/4243 |
| | | | | 711/155 |
| 2010/0030976 | A1 * | 2/2010 | Tashima | G06F 13/4239 |
| | | | | 711/E12.001 |
| 2010/0100714 | A1 * | 4/2010 | Noyes | G06F 9/34 |
| | | | | 712/E9.023 |
| 2010/0332887 | A1 * | 12/2010 | Lin | G06F 12/0246 |
| | | | | 713/340 |
| 2011/0320716 | A1 * | 12/2011 | Collura | G06F 11/0751 |
| | | | | 711/E12.017 |
| 2012/0135748 | A1 * | 5/2012 | Lee | H04W 4/029 |
| | | | | 455/456.1 |
| 2014/0201403 | A1 * | 7/2014 | Sato | G06F 11/3648 |
| | | | | 710/107 |
| 2015/0100744 | A1 * | 4/2015 | Mirichigni | G06F 12/023 |
| | | | | 711/154 |
| 2015/0199137 | A1 * | 7/2015 | Shin | G06F 3/0679 |
| | | | | 711/103 |
| 2016/0357701 | A1 * | 12/2016 | Lee | G06F 1/24 |
| 2018/0062377 | A1 * | 3/2018 | Chen | H04L 12/10 |
| 2018/0068734 | A1 * | 3/2018 | Zhou | G11C 16/20 |
| 2018/0074983 | A1 * | 3/2018 | Kawashima | G06F 12/1081 |
| 2019/0227611 | A1 * | 7/2019 | Nam | G06F 1/305 |
| 2020/0159461 | A1 * | 5/2020 | Liang | G06F 3/0659 |
| 2021/0181972 | A1 * | 6/2021 | Li | G06F 13/28 |
| 2021/0399925 | A1 * | 12/2021 | Lee | H04L 25/0272 |
| 2022/0300206 | A1 * | 9/2022 | Furuta | G06F 3/0683 |
| 2023/0027611 | A1 * | 1/2023 | Chen | G06F 13/385 |

FOREIGN PATENT DOCUMENTS

| | | | | |
|---|---|---|---|---|
| CN | 101552548 B | * | 1/2011 | |
| CN | 102478872 A | * | 5/2012 | |
| CN | 101303882 B | * | 6/2012 | G11C 5/147 |
| CN | 101908134 B | * | 7/2013 | |
| CN | 104793965 A | * | 7/2015 | |
| CN | 102478952 B | * | 12/2015 | |
| CN | 105934747 A | * | 9/2016 | G06F 11/1004 |
| CN | 205864448 U | * | 1/2017 | |
| CN | 106468773 A | * | 3/2017 | |
| CN | 107015933 A | * | 8/2017 | G01M 17/007 |
| CN | 107482747 A | * | 12/2017 | |
| CN | 104793965 B | * | 5/2018 | |
| CN | 105281743 B | * | 9/2018 | |
| CN | 109490760 A | * | 3/2019 | |
| CN | 109709414 A | * | 5/2019 | |
| CN | 109800187 A | * | 5/2019 | G06F 12/0246 |
| CN | 110413555 B | * | 2/2021 | G06F 13/4068 |
| CN | 112583417 A | * | 3/2021 | G06F 3/0202 |
| CN | 112639756 A | * | 4/2021 | G06F 13/3625 |
| CN | 112732602 A | * | 4/2021 | |
| CN | 112817893 A | * | 5/2021 | |
| CN | 112880814 A | * | 6/2021 | G01H 17/00 |
| CN | 113363986 A | * | 9/2021 | G06F 1/28 |
| CN | 113396404 A | * | 9/2021 | G06F 13/4027 |
| CN | 214502664 U | * | 10/2021 | G01H 17/00 |
| CN | 113840047 A | * | 12/2021 | |
| CN | 113989099 A | * | 1/2022 | G06F 13/4027 |
| CN | 114119758 A | * | 3/2022 | |
| CN | 109257260 B | * | 5/2022 | G06F 1/263 |
| CN | 114609938 A | * | 6/2022 | |
| CN | 114119758 B | * | 7/2022 | |
| CN | 114758667 A | * | 7/2022 | |
| CN | 113507404 B | * | 11/2022 | G06F 1/263 |
| CN | 115312110 A | * | 11/2022 | G06F 30/3308 |
| CN | 115605854 A | * | 1/2023 | G06F 13/4072 |
| CN | 115686164 A | * | 2/2023 | G06F 13/385 |
| CN | 115903618 A | * | 4/2023 | |
| CN | 116166256 A | * | 5/2023 | |
| EP | 1793315 B1 | * | 2/2010 | G06F 13/4059 |
| GB | 2484524 A | * | 4/2012 | G06F 1/26 |
| JP | 2008041089 A | * | 2/2008 | G06F 11/3419 |
| JP | 2008186457 A | * | 8/2008 | G06F 13/161 |
| JP | 2011065514 A | * | 3/2011 | G06F 13/385 |
| JP | 5063240 B2 | * | 10/2012 | G06F 11/3419 |
| JP | 5506304 B2 | * | 5/2014 | G06F 13/385 |
| JP | 5571288 B2 | * | 8/2014 | G06F 13/161 |
| JP | 2014179719 A | * | 9/2014 | |
| TW | 201023033 A | | 6/2010 | |
| TW | 201710921 A | * | 3/2017 | G06F 13/385 |
| TW | 202105179 A | * | 2/2021 | G06F 13/4282 |
| TW | 202115533 A | * | 4/2021 | G06F 3/0202 |
| TW | 202117552 A | * | 5/2021 | G06F 13/24 |
| TW | 202119218 A | * | 5/2021 | G06F 1/1632 |
| TW | 202134823 A | * | 9/2021 | G06F 1/28 |
| TW | 783707 B1 | * | 11/2022 | G06F 13/385 |
| TW | 202305544 A | * | 2/2023 | G06F 13/385 |
| WO | WO-9625708 A1 | * | 8/1996 | G06F 13/385 |
| WO | WO-2011029385 A1 | * | 3/2011 | H04L 12/10 |
| WO | WO-2017063577 A1 | * | 4/2017 | G06F 9/445 |
| WO | WO-2023068490 A1 | * | 4/2023 | G06F 1/266 |

OTHER PUBLICATIONS

V. S. Katkar, D. K. Shah and S. S. Ashtekar, "FPGA Implementation of I2C Based Networking System for Secure Data Transmission," 2019 International Conference on Advances in Computing, Communication and Control (ICAC3), Mumbai, India, 2019, pp. 1-5, doi: 10.1109/ICAC347590.2019.9036785. (Year: 2019).*

B. Eswari, N. Ponmagal, K. Preethi and S. G. Sreejeesh, "Implementation of I2C master bus controller on FPGA," 2013 International Conference on Communication and Signal Processing, Melmaruvathur, India, 2013, pp. 678-681, doi: 10.1109/iccsp.2013.6577141. (Year: 2013).*

W. Andrysiewicz, D. Kościelnik and M. Miśkowicz, "I2C hardware master serial interface for asynchronous ADCs," 2015 IEEE Inter-

(56) References Cited

OTHER PUBLICATIONS national Symposium on Systems Engineering (ISSE), Rome, Italy, 2015, pp. 77-81, doi: 10.1109/SysEng.2015.7302736. (Year: 2015).*

* cited by examiner

POWER SUPPLY DEVICE, POWER SUPPLY SYSTEM AND NON-TRANSITORY COMPUTER-READABLE RECORDING MEDIUM

CROSS-REFERENCE TO RELATED APPLICATION

This application claims the priority benefit of CHINA Application serial no. 202110844943.2, filed Jul. 26, 2021, the full disclosure of which is incorporated herein by reference.

FIELD OF INVENTION

The invention relates to a power supply device, a power supply system and a non-transitory computer-readable recording medium, more particularly, the invention relates to a power supply device, a power supply system and a non-transitory computer-readable recording medium for loading and upgrading the power supply device.

BACKGROUND

In the power supply system, it is usually necessary to support as many as (usually up to 12) power supply devices. After the entire system is turned on, the host software system will first be started. When it runs to loading the subsystem of the power supply device, the firmware version of the power supply device is checked. When a new version is available, the system firmware upgrade of the power supply device is initiated, which will run on the external control circuit. After the upgrade is completed, during the startup of the external control circuit, the internal firmware of all power supply devices will be loaded.

The power supply device is an I2C slave device. Take 12 power supply devices as an example. Set the power supply devices to different I2C addresses, such as 0x20, 0x22, 0x24 . . . 0x34, to upgrade the firmware of 12 power supply devices one by one. This needs to be repeated 12 times, which is time consuming. In addition, the upgrade method adopts the request/reply method, and the external control circuit transmits the next frame of data after receiving the previous frame of reply. If a frame of request includes 32 bit of control data, 32 bit of transmission data, and 32 bit of reply data, in this case, the utilization rate of the firmware data load is 1/3, which is low.

SUMMARY

An aspect of this disclosure is to provide a power supply device. The power supply device includes a register circuit, an internal control circuit, and a storage circuit. The register circuit includes a first sub-register circuit and a second sub-register circuit. The first sub-register circuit and the second sub-register circuit are configured to take turns to temporarily store a data transmitted form an external control circuit. The internal control circuit is coupled to the register circuit, and the internal control circuit is configured to obtain the data temporarily stored in the first sub-register circuit and the second sub-register circuit. The storage circuit is coupled to the internal control circuit, and the storage circuit is configured to obtain the data from the internal control circuit and to store the data.

Another aspect of this disclosure is to provide a power supply system. The power supply system includes an external control circuit and several power supply devices. The external control circuit is configured to transmits a data. Several power supply devices are coupled to the external control circuit. Every one of several power supply devices includes a register circuit, an internal control circuit, and a storage circuit. The register circuit includes a first sub-register circuit and a second sub-register circuit, in which the first sub-register circuit and the second sub-register circuit are configured to take turns to temporarily store the data transmitted from the external control circuit. The internal control circuit is coupled to the register circuit, and the internal control circuit is configured to obtain the data temporarily stored in the first sub-register circuit and the second sub-register circuit from the register circuit. The storage circuit is coupled to the internal control circuit, and the storage circuit is configured to obtain and store the data from the control circuit.

Another aspect of this disclosure is to provide a non-transitory computer-readable recording medium. The non-transitory computer-readable recording medium is configured to store a computer program and is configured to perform a data transmission method, applicable for a power supply system, wherein the data transmission method includes the following operations: receiving a data transmitted from an external control circuit by a register circuit of a power supply device, wherein a first sub-register circuit and a second sub-register circuit of the register circuit take turns to temporarily store the data; and obtaining the data temporarily stored in an internal control circuit of a power supply device from the register circuit, and stores the data in a storage circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
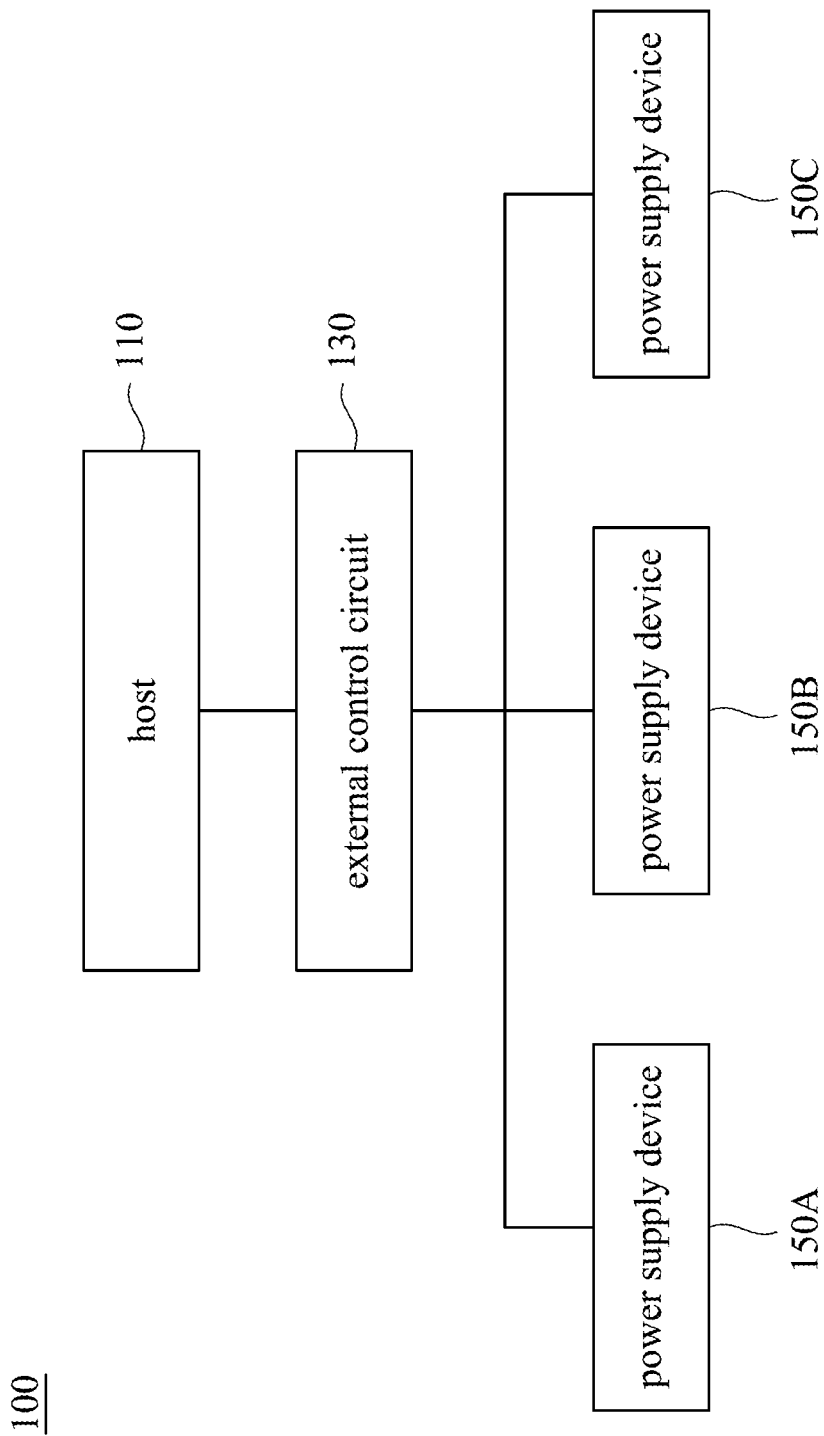
FIG. 1 is a schematic diagram illustrating a power supply system according to some embodiments of the present disclosure.

Reference is made to FIG. 1. FIG. 1 is a schematic diagram illustrating the power supply system 100 according to some embodiments of the present disclosure.

Take FIG. 1 as an example, the power supply system 100 includes the host 110, the external control circuit 130 and several power supply devices 150A to 150C. In the connection relationship, the host 110 is coupled to the external control circuit 130, and the several power supply devices 150A to 150C are coupled to the external control circuit 130.

Figure 2:
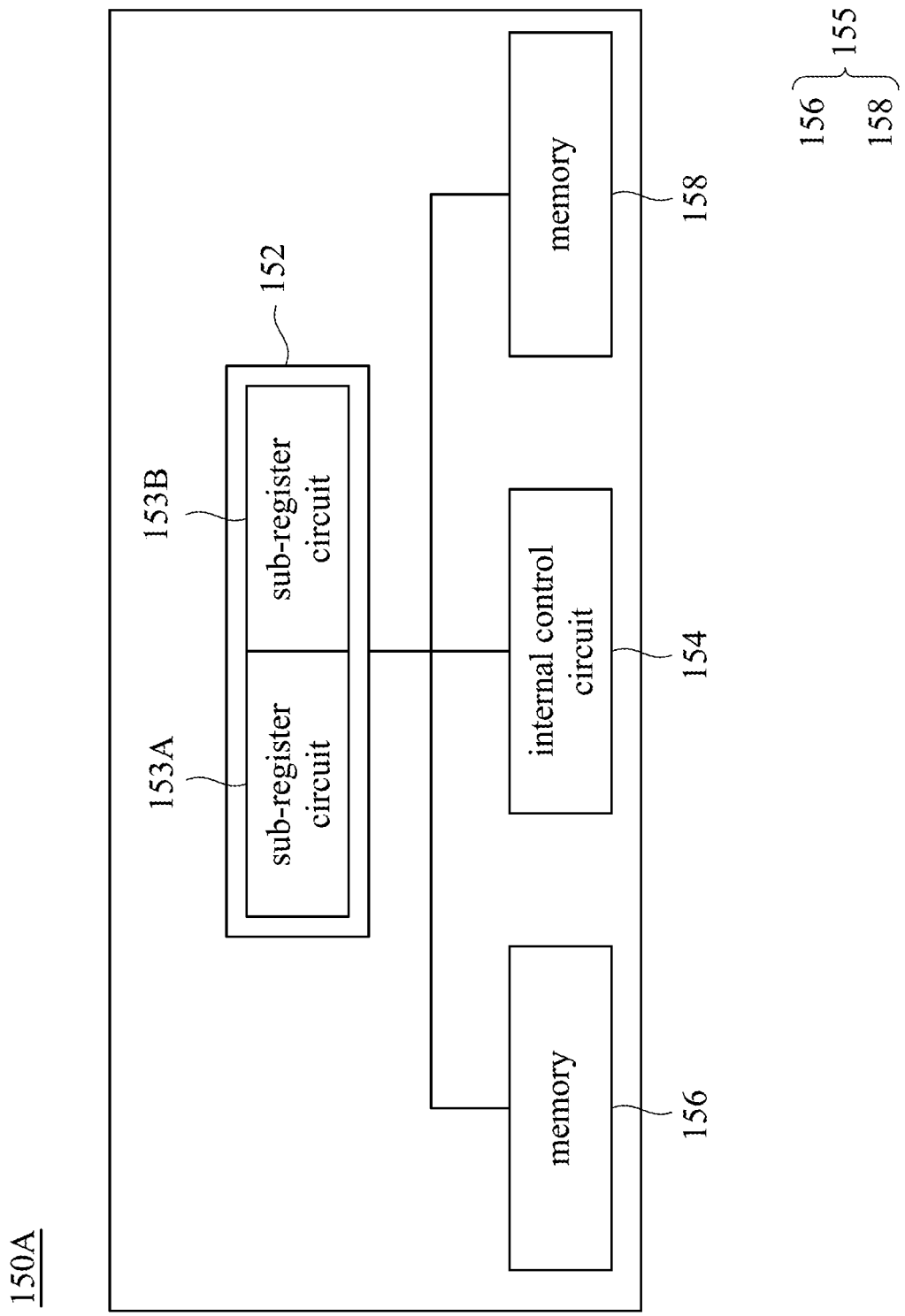
FIG. 2 is a schematic diagram illustrating a power supply device according to some embodiments of the present disclosure.

Reference is made to FIG. 2. FIG. 2 is a schematic diagram illustrating the power supply device 150A according to some embodiments of the present disclosure. Only the power supply device 150A is taken as an example for description, and the rest of the power supply devices 150B and 150C are the same or similar to the power supply device 150A.

Take FIG. 2 as an example. The power supply device 150A includes the register circuit 152, the internal control circuit 154 and the storage circuit 155. In the connection relationship, the register circuit 152 is connected to the internal control circuit 154. The internal control circuit 154 is further connected to the storage circuit 155. The register circuit 152 further includes the sub-register circuits 153A and 153B.

The power supply system 100 and the power supply device 150A mentioning above are for illustrative purposes only, various configurations of power supply system 100 and power supply device 150A are within the scope of the present disclosure. The detailed operation methods of the power supply system 100 and the power supply device 150A will be described in reference to FIG. 3 below.

Figure 3:
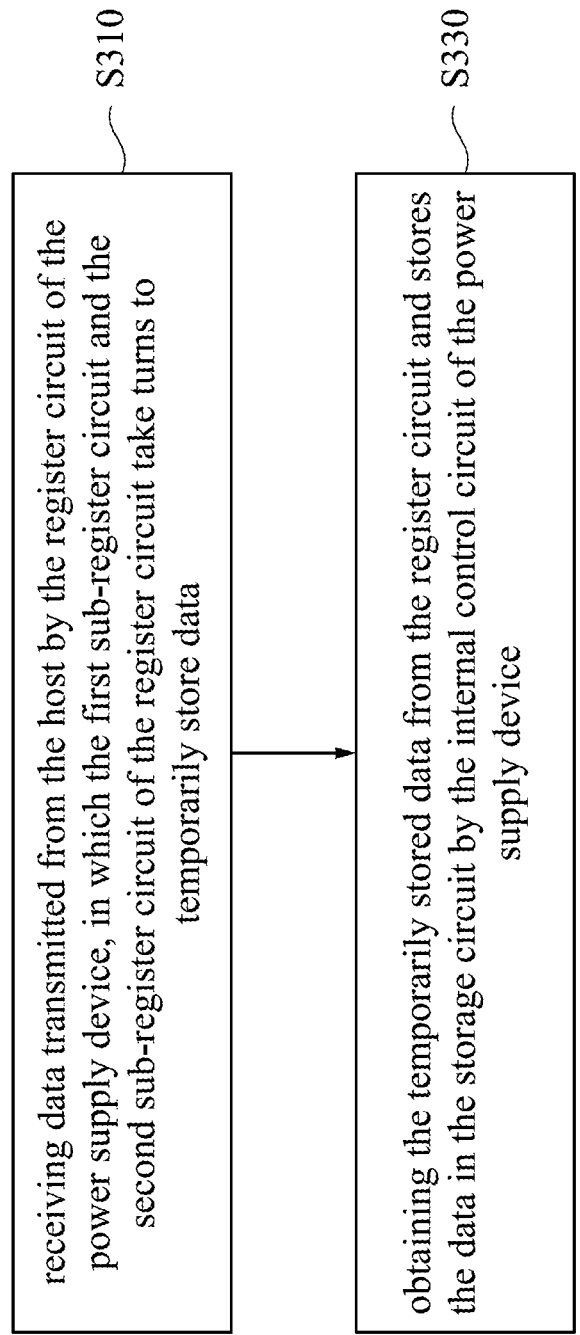
FIG. 3 is a flow chart of data transmission method according to some embodiments of the present disclosure.

FIG. 3 is a flow chart illustrating the data transmission method 300 according to some embodiments of the present disclosure. The data transmission method 300 may be applied to the power supply system 100 as illustrated in FIG. 1 and the power supply device 150A as illustrated in FIG. 2. Reference is made to FIG. 1 to FIG. 3 at the same time below.

In operation S310, data transmitted from the external control circuit is received by the register circuit of the power supply device, wherein the first sub-register circuit and the second sub-register circuit of the register circuit take turns to temporarily store data. In some embodiments, operation S310 is operated by the power supply devices 150A to 150C as illustrated in FIG. 1.

In some embodiments, reference is made to FIG. 1 together. When the external control circuit 130 transmits data to the power supply devices 150A to 150C, the external control circuit 130 transmits data to the power supply devices 150A to 150C with the method of broadcasting. Furthermore, In some embodiments, The external control circuit 130 and the power supply devices 150A to 150C use an integrated bus circuit (I2C) for data transmission. Accordingly, when the external control circuit 130 wants to transmit data to the power supply devices 150A to 150C, all the power supply devices 150A to 150C use the same I2C broadcast address. In this way, the external control circuit 130 only needs to send once, and the several power supply devices 150A to 150C receive at the same time.

In some embodiments, when the external control circuit 130 transmits data to the power supply device 150A, only one request/reply (request reply) process is in need, which increases the utilization of the integrated bus circuit (I2C) and reduces the delay time between two data packets in the traditional way.

Figure 4:
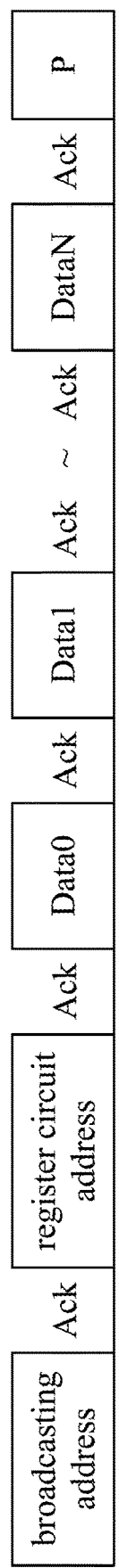
FIG. 4 is a schematic diagram illustrating data according to some embodiments of the present disclosure.

Reference is made to FIG. 4 together. FIG. 4 is a schematic diagram illustrating data 400 according to some embodiments of the present disclosure. As illustrated in FIG. 4, the data 400 transmitted by the external control circuit 130 includes the broadcast address, register circuit address and all data packets Data0 to DataN to be transmitted. In this way, since the data is transmitted once, there will be only one request/reply process.

In some embodiments, the "take turns to temporarily store data" mentioned in operation S310 refers to temporarily storing the first part of the data in the sub-register circuit 153A, temporarily storing the second part of the data in the sub-register circuit 153B, temporarily storing the third part of the data in the sub-register circuit 153A, and temporarily storing the fourth part of the data in the sub-register circuit 153B, and the rest can be deduced by analogy.

In operation S330, the internal control circuit of the power supply device obtains the data temporarily stored in the register circuit and stores the data in the storage circuit. In some embodiments, operation S330 is operated by the power supply device 150A in FIG. 2.

Reference is made to FIG. 2 together. In some embodiments, after the register circuit 152 of the power supply device 150A receives the data, the sub-register circuits 153A and 153B temporarily store data. Then, the internal control circuit 154 obtains the data temporarily stored in the sub-register circuits 153A and 153B, and the internal control circuit 154 stores the data temporarily stored in the sub-register circuits 153A and 153B to the storage circuit 155.

For example, when the sub-register circuit 153A temporarily stores the first part of the data, the internal control circuit 154 obtains the first part of the data from the sub-register circuit 153A and stores to the storage circuit. Then, when the sub-register circuit 135B temporarily stores the second part of the data, the internal control circuit 154 obtains the second part of the data from the sub-register circuit 153B and stores in the circuit. The rest and so on.

Figure 5:
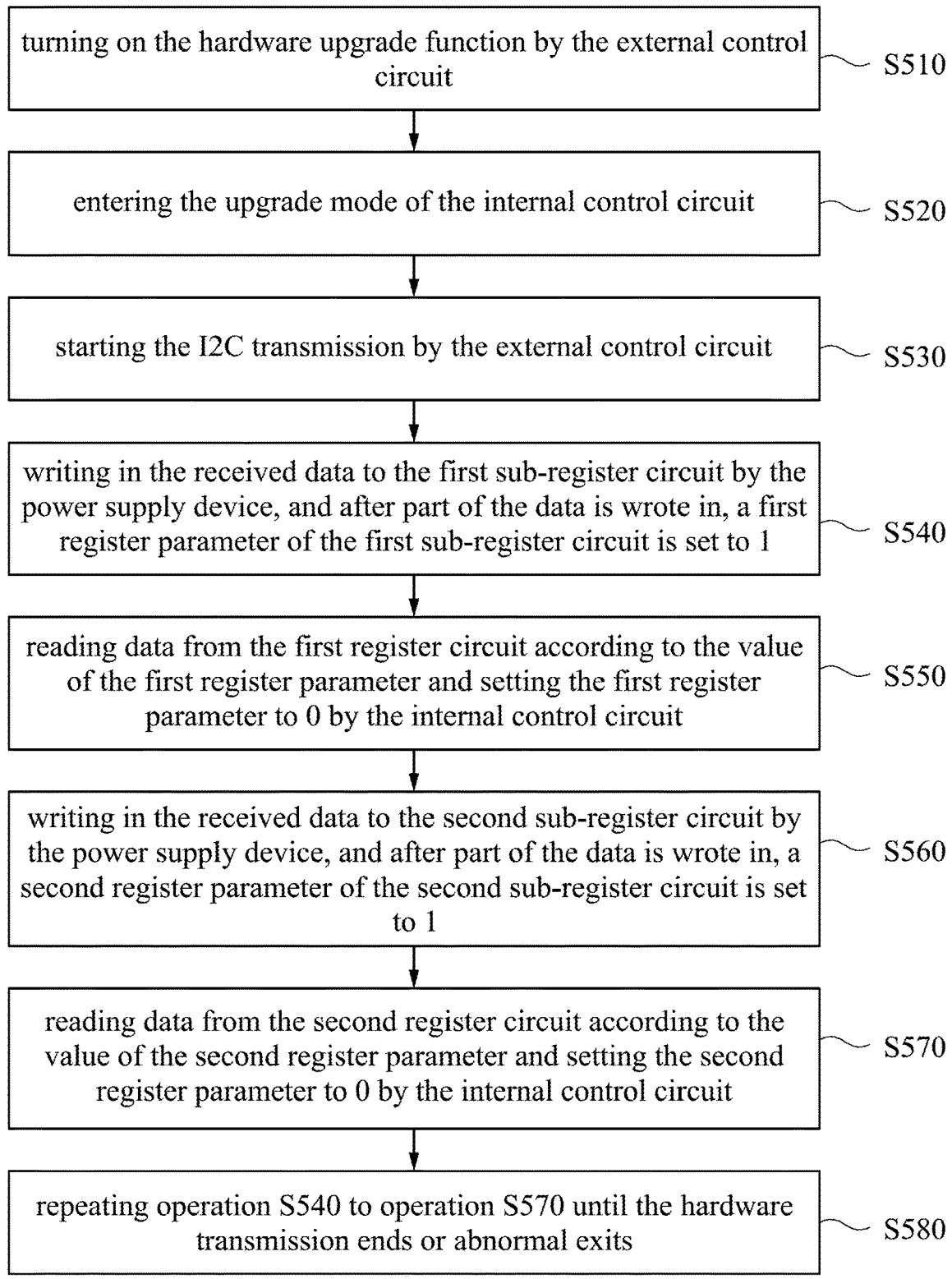
FIG. 5 is a flow chart illustrating a data transmission method according to some embodiments of the present disclosure.

Reference is made to FIG. 5. FIG. 5 is a flow chart illustrating a data transmission method 500 according to some embodiments of the present disclosure. The data transmission method 500 includes operation S510 to S580.

In operation S510, the external control circuit turns on the firmware upgrade function. For example, in some embodiments, the external control circuit 130 in FIG. 1 sets the parameter IMG_UGD_EN to 1, so as to turn on the firmware upgrade function.

In operation S520, the internal control circuit enters the upgrade mode. For example, in some embodiments, the external control circuit 130 in FIG. 1 sets the parameter IMG_UGD_TRIG to 1, the power supply device 150 clears the previously set register parameter, the internal control circuit 154 in FIG. 2 sets the parameter IMG_UGD_RDY, so that the power supply device 150 enters the upgrade mode.

In operation S530, the external control circuit starts the I2C transmission. For example, in some embodiments, the external control circuit 130 performs the polling between the power supply devices 150A to 150C, until all of the power supply devices 150A to 150C enter the upgrade mode, and then the I2C transmission is started. The address of I2C transmission is the common broadcast address for performing polling between the power supply devices 150A to 150C, the data transmission of the I2C adopts sequential write in), in which the data is one-time transmitted to the I2C line in bytes order.

In operation S540, the power supply device write in the received data to the first sub-register circuit, after writing in part of the data, the first register parameter of the first sub-register circuit is set to 1. For example, in some embodiments, the power supply device 150A as illustrated in FIG. 2 write in the received data to the sub-register circuit 153A. After the sub-register circuit 153A stores first 4 bytes of the data, the register parameter EX2IN_MCU_DATA0_RDY is set to 1.

In operation S550, the internal control circuit reads data from the first register circuit according to the value of the first register parameter, and the internal control circuit sets the first register parameter to 0. For example, in some embodiments, the internal control circuit 154 as illustrated in FIG. 2 performs polling between the sub-register circuit 153A and 153B. When the internal control circuit 154 performs polling and acknowledges that the register parameter EX2IN_MCU_DATA0_RDY of the sub-register circuit 153A is 1, the internal control circuit 154 reads data from the sub-register circuit 153A. After the data is read, the internal control circuit 154 sets the register parameter EX2IN_MCU_DATA0_RDY to 0. In some embodiments, the internal control circuit 154 further stores the obtained data in the storage circuit 155.

In operation S560, the power supply device writes in the received data to the second sub-register circuit. After the part of the data is written in, the second register parameter of the second sub-register circuit is set to 1. For example, In some embodiments, the power supply device 150A as illustrated in FIG. 2 writes in the received data to the sub-register circuit 153B. After the sub-register circuit 153B stores the second 4 bytes of the data, the register parameter EX2IN_MCU_DATA1_RDY is set to 1.

In operation S570, the internal control circuit reads data from the second register circuit according to the value of the second register parameter, and the second register parameter is set to 0. For example, in some embodiments, the internal control circuit 154 as illustrated in FIG. 2 performs polling between the sub-register circuit 153A and 153. When the internal control circuit 154 performs polling and acknowledges that the register parameter EX2IN_MCU_DATA1_RDY of the sub-register circuit 153B is 1, the internal control circuit 154 reads data from the sub-register circuit 153B, and after the data is read, the register parameter EX2IN_MCU_DATA1_RDY is set to 0. In some embodiments, the internal control circuit 154 stores the received data in the storage circuit 155.

In operation S580, operation S540 to operation S570 are repeated until the firmware transmission ends or abnormal exists. For example, in some embodiments, the third 4 bytes data is written in to the sub-register circuit 153A, the fourth 4 bytes data is written in the sub-register circuit 153B, the fifth 4 bytes data is written in to the sub-register circuit 153A, the rest and so on.

In some embodiments, if the power supply device 150A wants to receive data, and both of the first register parameter and the second register parameter are 1, the internal control circuit is further configured to transmit no reply signal (NOACK) to the external control circuit 130, so that the external control circuit 130 stops transmitting data.

For example, if the power supply device 150A wants to receive the next 4 bytes data, and both of the register parameter EX2IN_MCU_WORD0_RDY and the register parameter EX2IN_MCU_WORD1_RDY are 1, it is indicated that the internal control circuit 154 does not have enough time to readout the data in the sub-register circuit 153A or 153B. At this time, the internal control circuit 154 transmits NOACK signal to the external control circuit 130, so as to stop receiving the data transmitted by the external control circuit 130. At the same time, the internal control circuit 154 sets the parameter IMG_UGD_TRIG to 0 and sets the parameter EX2IN_MCU_FAIL to 1, to indicate that the update process performed by the external control circuit 130 is failed. Therefore, in the implementation of the present disclosure, it is necessary to confirm that the processing speed of the internal control circuit 154 needs to be faster than the transmission speed on the I2C line.

In some embodiments, after the power supply device 150A receives the stop signal transmitted by the external control circuit 130, the internal control circuit 154 of the power supply device 150A set the parameter IMG_UGD_TRIG to 0 and set the parameter EX2_IN_MCU DONE to 1. After the internal control circuit 154 parses the END flag, the internal control circuit 154 stops accessing data, clears the parameter IMG_UGD_INT, and ends the updating process.

In some embodiments, the internal control circuit 154 further performs a checksum during the process of receiving data. When the transmission ends, the calculated sum check value with the last 4 bytes data are compared. If there is no error, set the parameter IMG_CRC_CHECK_PASS to 1. If there is an error, the parameter IMG_CRC_CHECK_PASS is set to 0. After the external control circuit 130 has sent all the data, the external control circuit 130 will check whether the power supply device 150A has received the right data or not. If the external control circuit 130 reads the parameter IMG_CRC_CHECK_PASS of the register circuit 152 is 1, it means the upgrade is successful. Conversely, if the parameter IMG_CRC_CHECK_PASS is not 1, it means that the upgrade has failed. The data transmission method 500 is re-executed to perform the upgrade.

Reference is made to FIG. 2 again. In some embodiments, the storage circuit 155 further comprises the memory 156 (the data memory DMEM) and the memory 158 (the command memory IMEM). The internal control circuit 154 is further configured to store the data to the memory 156 or memory 158 according to the data received.

According to the embodiments mentioning above, some other embodiments of the present disclosure provide a non-transitory computer-readable recording medium. The non-transitory computer-readable recording medium store the computer program and is configured to execute the aforementioned data transmission method 300 as shown in FIG. 3 or the data transmission method 500 as shown in FIG. 5. In some embodiments, the non-transitory computer-readable recording medium is stored in the power supply device 150A, 150B, 150C and/or the external control circuit 130 as illustrated in FIG. 1.

In some embodiments, the host 110 is configured to control the operation of the external control circuit 130.

In summary, the present disclosure provides a power supply device, a power supply system a and non-transitory computer-readable recording medium, through the external control circuit, the transmission data is transmitted to all power supply devices sharing the broadcast address on the I2C bus at a time by I2C sequential writing. Through the sub-register circuit in the power supply device, the data of the I2C bus is continuously received in a loop, and through the setting of the dedicated register parameter, whether the sub-register circuit has stored data is marked, and an error signal is sent to the external control circuit when the sub-register circuit cannot continue to store data. In addition, the internal control circuit cooperates with the behavior of the power supply device to obtain data from the sub-register circuit and to perform data parsing and storing.

Accordingly, in the embodiments of the present disclosure, the broadcast method saves the transmission time. For the sequence write in method, in addition to the two bytes for the initial I2C address and the register circuit address, the rest of the bytes are effective for data transmission, and the utilization rate of I2C is nearly 100%. In addition, through the design of two sub-register circuits and the register parameters, it is ensured that when the internal control circuit is reading the data in a sub-register circuit, the power supply device can continue to receive data on the I2C bus, to ensure that the I2C can be transmitting data without interruption.

Various functional elements have been disclosed herein. For those skilled in the art, functional elements can be realized by circuits (whether a dedicated circuit or a general-purpose circuit operated under the control of one or several processors and code commands).

Although the present disclosure has been disclosed in the above embodiments, it is not intended to limit the present disclosure. Anyone with ordinary knowledge in the field can make various changes and modifications without departing from the spirit and scope of the present disclosure. Therefore, the protection scope of this disclosure shall be subject to those defined by the attached patent scope.

Various functional elements have been disclosed herein. For those skilled in the art, functional elements can be implemented by circuits (whether a dedicated circuit or a general-purpose circuit operated under the control of one or more processors and coded instructions).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power supply device, comprising:
a register circuit, comprising a first sub-register circuit and a second sub-register circuit, wherein the first sub-register circuit and the second sub-register circuit are configured to take turns to temporarily store a data transmitted from an external control circuit, wherein the first sub-register circuit is configured to temporarily store a first part of the data, and the second sub-register circuit is configured to temporarily store a second part of the data, wherein the data comprises a register circuit address and a plurality of data packets;
an internal control circuit, coupled to the register circuit, and is configured to obtain the data temporarily stored in the first sub-register circuit and the second sub-register circuit; and
a storage circuit, coupled to the internal control circuit, and is configured to obtain the data from the internal control circuit and to store the data.

2. The power supply device of claim 1, wherein the data transmitted by the external control circuit is broadcast transmitted from the external control circuit to the register circuit.

3. The power supply device of claim 1, wherein when the plurality of data packets are transmitted, the plurality of data packets comprise only a request/reply process.

4. The power supply device of claim 1, wherein the first sub-register circuit comprises a first register parameter, and the second sub-register circuit comprises a second register parameter, wherein when the first register parameter is a first value, the first sub-register circuit transmits the first part of the data temporarily stored to the internal control circuit, and when the first register parameter is a second value, the first sub-register circuit receives and temporarily stores a third part of the data transmitted from the external control circuit, wherein when the second register parameter is the first value, the second sub-register circuit transmits the second part of the data temporarily stored to the internal control circuit, and when the second register parameter is the second value, the second sub-register circuit receives and temporarily stores a fourth part of the data transmitted from the external control circuit.

5. The power supply device of claim 4, wherein after the internal control circuit obtains the first part of the data temporarily stored by the first sub-register circuit, the internal control circuit set the first register parameter to the first value, and after the internal control circuit obtains the second part of the data temporarily stored by the second sub-register circuit, the internal control circuit set the second register parameter to the first value.

6. The power supply device of claim 4, wherein the internal control circuit is further configured to perform polling between the first sub-register circuit and the second sub-register circuit to obtain the first register parameter and the second register parameter.

7. The power supply device of claim 4, wherein when both of the first register parameter and the second register parameter are the second value, the internal control circuit if further configured to transmit a no reply signal to the external control circuit, so that the external control circuit stops transmitting the data.

8. A power supply system, comprising:
an external control circuit, configured to transmits a data, wherein the data comprises a register circuit address and a plurality of data packets; and
a plurality of power supply devices, coupled to the external control circuit, wherein every one of the plurality of power supply devices comprises:
a register circuit, comprising a first sub-register circuit and a second sub-register circuit, wherein the first sub-register circuit and the second sub-register circuit are configured to take turns to temporarily store the data transmitted from the external control circuit, wherein the first sub-register circuit is configured to temporarily store a first part of the data, and the second sub-register circuit is configured to temporarily store a second part of the data;
an internal control circuit, coupled to the register circuit, and is configured to obtain the data temporarily stored in the first sub-register circuit and the second sub-register circuit from the register circuit; and
a storage circuit, coupled to the internal control circuit, and is configured to obtain and store the data from the internal control circuit.

9. The power supply system of claim 8, wherein when the plurality of data packets are transmitted, the plurality of data packets comprise only a request/reply process.

10. The power supply system of claim 8, wherein the first sub-register circuit comprises a first register parameter, and the second sub-register circuit comprises a second register parameter, wherein when the first register parameter is a first value, the first sub-register circuit transmits the first part of the data temporarily stored to the internal control circuit, and when the first register parameter is a second value, the first sub-register circuit receives and temporarily stores a third part of the data transmitted from the external control circuit, wherein when the second register parameter is the first value, the second sub-register circuit transmits the second part of the data temporarily stored to the internal control circuit, and when the second register parameter is the second value, the second sub-register circuit receives and temporarily stores a fourth part of the data transmitted from the external control circuit.

11. The power supply system of claim 10, wherein after the internal control circuit obtains the first part of the data temporarily stored by the first sub-register circuit, the internal control circuit sets the first register parameter to the first value, and after the internal control circuit obtains the second part of the data temporarily stored by the second sub-register circuit, the internal control circuit set the second register parameter to the first value.

12. The power supply system of claim 10, wherein the internal control circuit is further configured to perform polling between the first sub-register circuit and the second sub-register circuit to obtain the first register parameter and the second register parameter.

13. The power supply system of claim 10, wherein when both of the first register parameter and the second register parameter are the second value, the internal control circuit is further configured to transmit a no reply signal to the external control circuit, so that the external control circuit stops transmitting the data.

14. A non-transitory computer-readable recording medium, configured to store a computer program and is configured to perform a data transmission method, applicable for a power supply system, wherein the data transmission method comprises:
  receiving a data transmitted from an external control circuit by a register circuit of a power supply device, wherein a first sub-register circuit and a second sub-register circuit of the register circuit take turns to temporarily store the data, wherein the data comprises a register circuit address and a plurality of data packets, wherein the operation of the first sub-register circuit and the second sub-register circuit taking turns to temporarily store the data transmitted from the external control circuit comprises:
    temporarily storing a first part of the data in the first sub-register circuit; and
    temporarily storing a second part of the data in the second sub-register circuit; and
  obtaining the data temporarily stored in an internal control circuit of a power supply device from the register circuit, and stores the data in a storage circuit.

15. The non-transitory computer-readable recording medium of claim 14, wherein the data transmission method further comprises:
  transmitting the data to the register circuit from the external control circuit with a broadcast method.

16. The non-transitory computer-readable recording medium of claim 14, wherein when the plurality of data packets transmit, the plurality of data packets comprise only a request/reply process.

17. The non-transitory computer-readable recording medium of claim 14, wherein the first sub-register circuit comprises a first register parameter, and the second sub-register circuit comprises a second register parameter, wherein the data transmission method further comprises:
  transmitting the first part of the data temporarily stored from the first sub-register circuit to the internal control circuit when the first register parameter is a first value;
  receiving and temporarily storing a third part of the data transmitted from the external control circuit by the first sub-register circuit when the first register parameter is a second value;
  transmitting the second part of the data temporarily stored from the second sub-register circuit to the internal control circuit when the second register parameter is the first value; and
  receiving and temporarily storing a fourth part of the data transmitted from the external control circuit by the second sub-register circuit when the second register parameter is the second value.

18. The non-transitory computer-readable recording medium of claim 17, wherein the data transmission method further comprises:
  performing polling between the first sub-register circuit and the second sub-register circuit to obtain the first register parameter and the second register parameter by the internal control circuit.

19. The non-transitory computer-readable recording medium of claim 17, wherein the data transmission method further comprises:
  transmitting a no reply signal to the external control circuit by the internal control circuit, so that the external control circuit stops transmitting the data when both of the first register parameter and the second register parameter are the second value.

20. The non-transitory computer-readable recording medium of claim 14, wherein the data transmission method further comprises:
  determining whether the data is transmitted successfully or not by the internal control circuit.

\* \* \* \* \*